(12) United States Patent
Trice (10) Patent No.: US 10,480,796 B2
(45) Date of Patent: Nov. 19, 2019

(54) HANDLE FOR A RACK SUPPORT STRUCTURE

(71) Applicant: Midea Group Co., Ltd., Beijiao (CN)

(72) Inventor: Daniel J. Trice, Louisville, KY (US)

(73) Assignee: MIDEA GROUP CO., LTD., Beijiao, Shunde, Foshan, Guangdong (CN)

(*) Notice: Subject to any disclaimer, the term of this patent is extended or adjusted under 35 U.S.C. 154(b) by 0 days.

(21) Appl. No.: 15/637,851

(22) Filed: Jun. 29, 2017

(65) Prior Publication Data

US 2019/0003723 A1 Jan. 3, 2019

(51) Int. Cl.
*F24C 15/16* (2006.01)
*F24C 15/36* (2006.01)
*A47J 37/06* (2006.01)

(52) U.S. Cl.
CPC .............. *F24C 15/16* (2013.01); *F24C 15/36* (2013.01); *A47J 37/0664* (2013.01); *A47J 37/0694* (2013.01); *F24C 15/166* (2013.01)

(58) Field of Classification Search
CPC .................................................... F24C 15/16
USPC ....... 294/9, 159; 16/423, 425, 426, 431–446
See application file for complete search history.

(56) References Cited

U.S. PATENT DOCUMENTS

| | | | |
|---|---|---|---|
| 1,637,303 A * | 7/1927 | Heath | ............. F24C 15/16 126/337 R |
| 2,144,474 A | 1/1939 | Woodman | |
| 3,450,861 A | 6/1969 | Hurko | |
| 4,197,611 A | 4/1980 | Bell et al. | |
| 4,924,071 A | 5/1990 | Jacobs | |
| 5,447,146 A | 9/1995 | Nickerson | |
| 5,638,807 A * | 6/1997 | Flamenbaum | ........ A47J 37/079 126/25 B |
| 5,836,634 A * | 11/1998 | Finkelman | ............ A45F 5/1026 294/159 |
| 6,170,694 B1 | 1/2001 | Munari et al. | |
| 7,490,732 B2 | 2/2009 | Wasserman et al. | |
| 7,673,628 B1 | 3/2010 | Shulman et al. | |
| 2002/0092132 A1* | 7/2002 | Kessler | ..................... B62B 5/06 16/436 |
| 2005/0076790 A1 | 4/2005 | Welch et al. | |
| 2009/0064989 A1 | 3/2009 | Shaffer | |

(Continued)

FOREIGN PATENT DOCUMENTS

CN 201840342 U 5/2011
CN 202477412 U 10/2012
(Continued)

OTHER PUBLICATIONS

Finley, Megan "Use Oven Rack Guards to Save Your Clumsy Limbs from Burning." www.offbeathome.com/oven-rack-guards/. Retrieved Mar. 20, 2017.

(Continued)

*Primary Examiner* — Avinash A Savani
*Assistant Examiner* — Rabeeul I Zuberi
(74) *Attorney, Agent, or Firm* — Middleton Reutlinger (57) ABSTRACT

A handle for a support structure in a cooking appliance. The handle may include an inner periphery and an outer periphery. The handle may include an opening defined by at least a forward member and a rearward member. The opening may extend from a top side to a bottom side of the handle. One or more inwardly facing contact surfaces of the handle may include a plurality of ribs.

17 Claims, 5 Drawing Sheets

(56) References Cited

U.S. PATENT DOCUMENTS

| | | |
|---|---|---|
| 2009/0200314 A1 | 3/2009 | Beck |
| 2010/0096116 A1 | 4/2010 | Good et al. |
| 2014/0021199 A1 | 1/2014 | Adeniyi et al. |
| 2014/0216438 A1* | 8/2014 | Hoffman .................. F24C 15/16 126/339 |
| 2016/0201923 A1 | 7/2016 | Evans et al. |

FOREIGN PATENT DOCUMENTS

| | | |
|---|---|---|
| CN | 204467859 U | 7/2015 |
| CN | 205267910 U | 6/2016 |

OTHER PUBLICATIONS

International Search Report and Writtien Opinion issued in Application No. PCT/CN2018/078748 dated Jun. 21, 2018.

* cited by examiner

HANDLE FOR A RACK SUPPORT STRUCTURE

BACKGROUND

The present embodiments relate to a handle integrated into the support structure within a cooking appliance, and particularly, but not limited to, for a gas and/or electric oven appliance.

Typical oven racks require the user to pull the hot oven rack out from the oven and push the hot oven rack into the oven with an oven mitt or pot holder. Thus there is a need to allow the consumer to engage a handle to push and/or pull the oven rack or support structure into and/or out of the oven interior thereby reducing the need for additional protective items such as the oven mitt or pot holder.

SUMMARY

In some embodiments, for example, an oven rack for supporting a cooking apparatus in an oven may comprise a support structure having a first thermal conductivity and may be configured to support the cooking apparatus thereon. In various embodiments, the oven rack may include a handle defining an inner periphery and an outer periphery. Moreover, in some embodiments, the inner periphery may define a through opening. Further, in various embodiments, the handle may have a second thermal conductivity. In some embodiments, the second thermal conductivity of the handle may be lower than the first thermal conductivity of the support structure.

In addition, in some embodiments, the inner periphery of the handle may include a plurality of ribs projecting inwardly. In various embodiments, the handle may include a plurality of ribs projecting outwardly. In various embodiments, the inner periphery of the handle may be continuous about the through opening. In some embodiments, the inner periphery of the handle may include at least a forward member and a rearward member defining the through opening. In addition, in various embodiments, the support structure may include a handle pocket. In some embodiments, the through opening may include a longitudinal axis extending from a top side of the handle towards a bottom side of the handle, wherein the longitudinal axis may be transverse to a plane of the support structure. In various embodiments, the through opening may extend through the support structure.

In some embodiments, an oven rack for supporting a cooking apparatus in an oven may comprise a support structure having a first thermal conductivity and may be configured to support the cooking apparatus thereon. In various embodiments, the oven rack may include a handle having a first member spaced away from a second member. In some embodiments, each of the first member and the second member may have an inwardly facing contact surface defining an opening therebetween. In various embodiments, the support structure may be outside the opening between the inwardly facing contact surfaces of the first member and second member. In some embodiments, the handle may have a second thermal conductivity, and the second thermal conductivity of the handle may be lower than the first thermal conductivity of the support structure.

In addition, in some embodiments, the first member may be adjacent a front end of the support structure and the second member may be spaced away towards a back end of the support structure. In various embodiments, the handle may include a top side and an opposing bottom side, wherein the opening may extend from the top side to the bottom side. Moreover, in some embodiments, the handle may include a pair of lateral members connecting opposing ends of each of the first member and second member, respectively. In various embodiments, the handle may include a top side and an opposing bottom side, wherein the bottom side may include a slot to receive the support structure. In some embodiments, a first portion of the slot adjacent the bottom side may be smaller than a second portion of the slot towards the top side. In various embodiments, the opening may include an axis transverse to a plane of the support structure.

Further, in some embodiments, an oven rack may comprise a support structure having a first thermal conductivity and a wire configuration in a first plane, wherein the wire configuration may have a front end and a back end. In various embodiments, the oven rack may include a handle having a second thermal conductivity, wherein the second thermal conductivity of the handle may be lower than the first thermal conductivity of the support structure. In some embodiments, the handle may be a ring shaped handle having an inner periphery and an outer periphery. In addition, in various embodiments, the inner periphery may define an opening extending substantially perpendicular to the first plane of the support structure. In some embodiments, the inner periphery of the handle may include a pair of opposing inwardly facing contact surfaces substantially perpendicular to the front end of the wire configuration to reduce user contact with the wire configuration.

In addition, in some embodiments, the oven rack may be in combination with an oven. In various embodiments, the outer periphery of the handle adjacent the front end of the support structure may include an outwardly facing contact surface, wherein the outwardly facing contact surface may be substantially parallel with the pair of opposing inwardly facing contact surfaces. Moreover, in some embodiments, the handle may include a slot on a bottom side of the handle to receive the support structure therein. In various embodiments, the slot may increase in size from the bottom side towards a top side of the handle. In some embodiments, the handle may include a top side and an opposing bottom side, wherein the opening defined by the inner periphery may be a through opening extending from the top side through the bottom side.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Numerous variations and modifications will be apparent to one of ordinary skill in the art, as will become apparent from the description below. Therefore, the invention is not limited to the specific implementations discussed herein.

Figure 1:
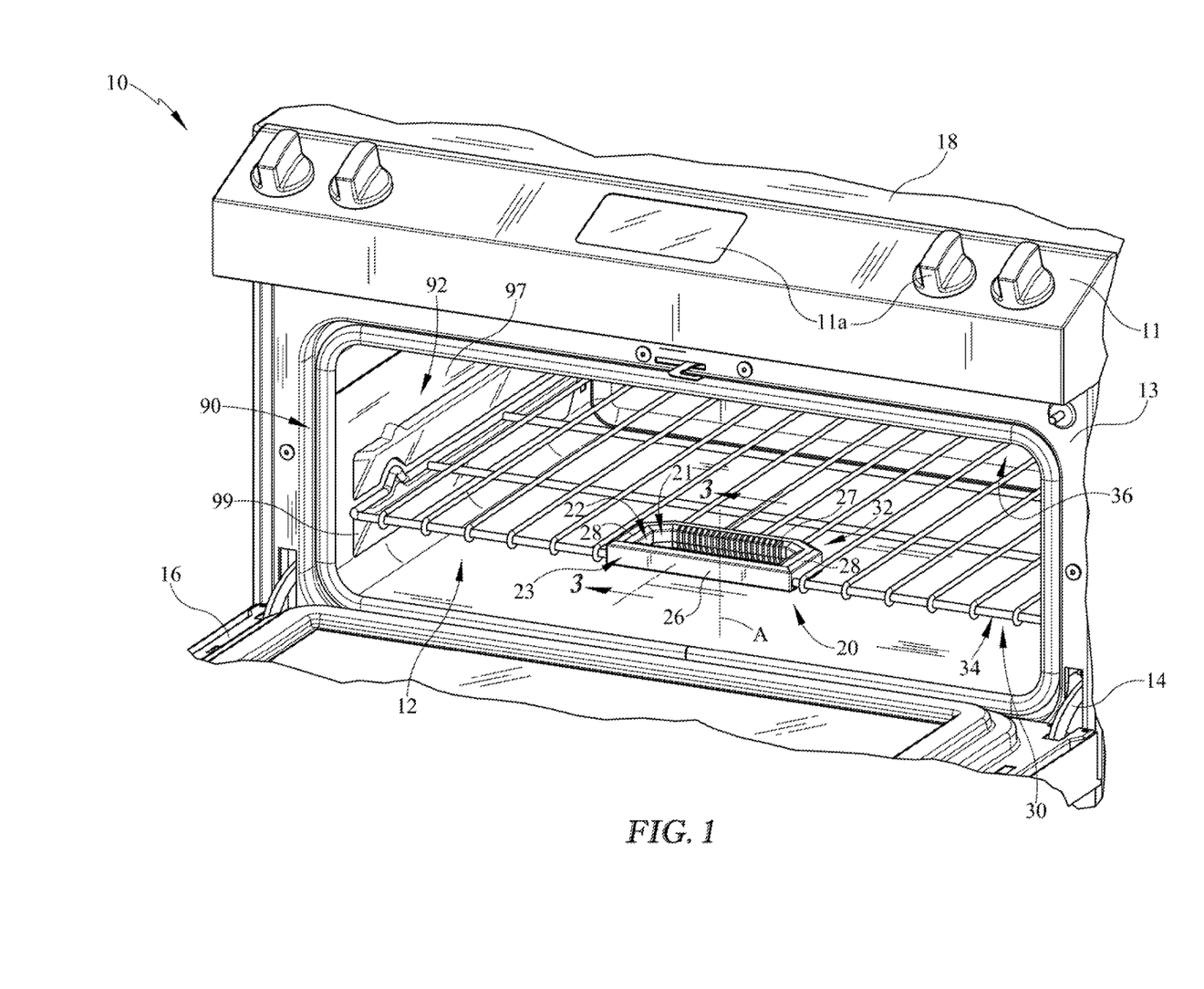
FIG. 1 is a perspective view of an embodiment of a handle within a cooking appliance, the oven front door is illustrated in the opened position and portions of the cooking appliance have been removed.

In the Figures, a handle 20 may include a support structure 30 within a cooking appliance 10. As shown in the embodiment of FIG. 1, an oven rack 12 may include a support structure 30 and the handle 20. The handle 20 allows the consumer to push, pull, lift, and/or reconfigure the support structure 30 between one or more positions with or without additional protective items (i.e. potholders). The consumer may identify the handle 20 as an intentional point of contact for the oven rack 12 to reduce the likelihood of touching the remaining portion of the support structure 30. Some embodiments of the handle 20 may allow a consumer with mobility issues to easily engage the handle 20 and manipulate the position of the support structure 30. For example, in some embodiments, a user may be able to pinch and pull the handle 20 to reposition the support structure 30 relative to the cooking appliance 10. Moreover, in various embodiments, a user may be able to insert one or more fingers or portions of the hand within an opening or depression 21 of the handle 20 and apply a force such as pulling without pinching. Further, in the embodiment shown in FIG. 3 the likelihood of contact with the support structure 30 may be reduced by allowing adequate finger and/or hand 1 access through the handle opening 21. The opening 21 of the handle 20 may allow for the reduction of contact with support structure 30 since the hand 1, or portions thereof, when being inserted into and/or out of the opening 21 is protected from coming into contact with the support structure 30 by the inner periphery 22 and/or one or more inwardly facing contact surfaces 40 (i.e. rearward, forward, and/or lateral contact surfaces).

Figure 2:
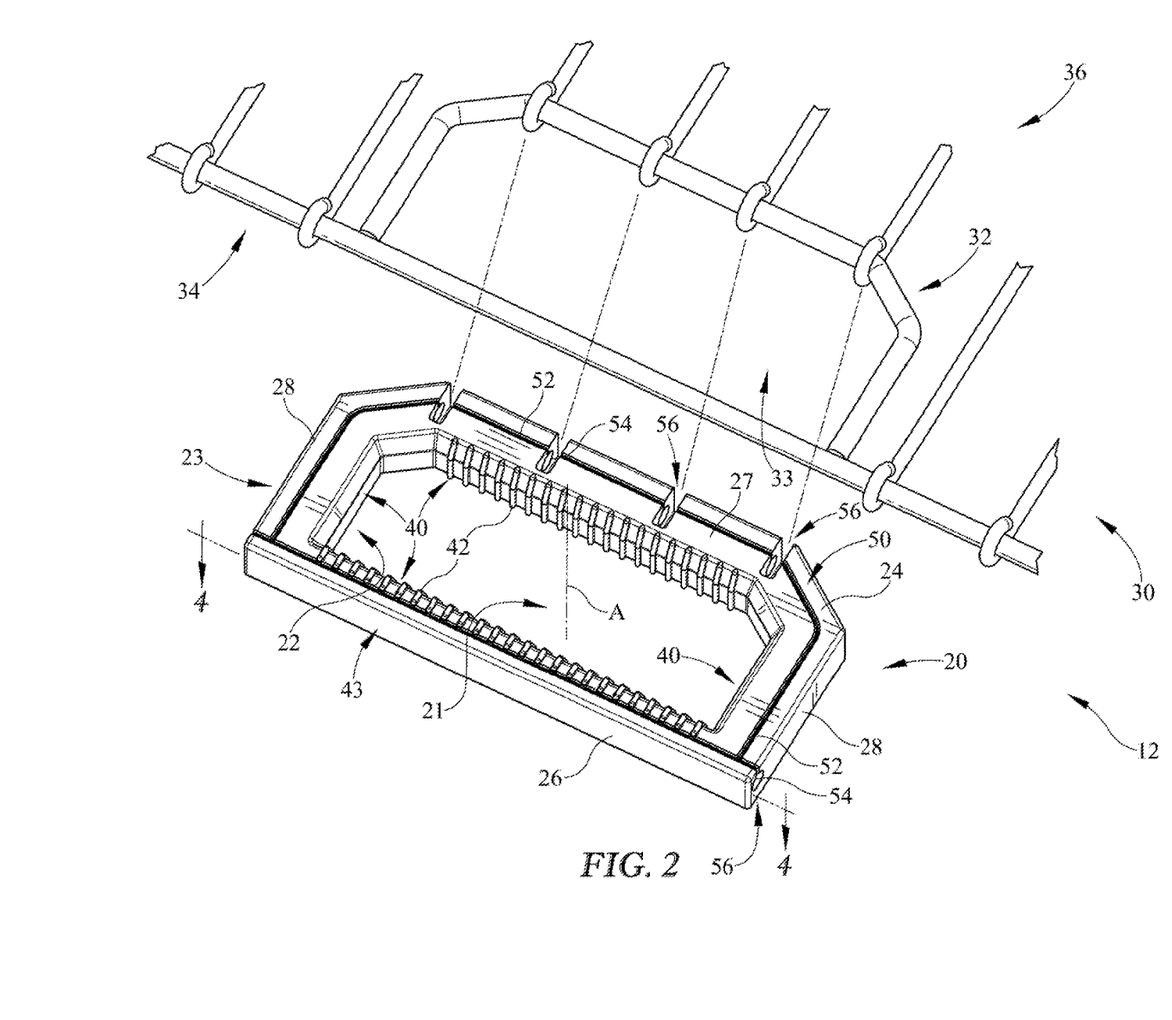
FIG. 2 is an exploded bottom view of the handle and support structure of FIG. 1, with portions of the support structure removed.
Figure 3:
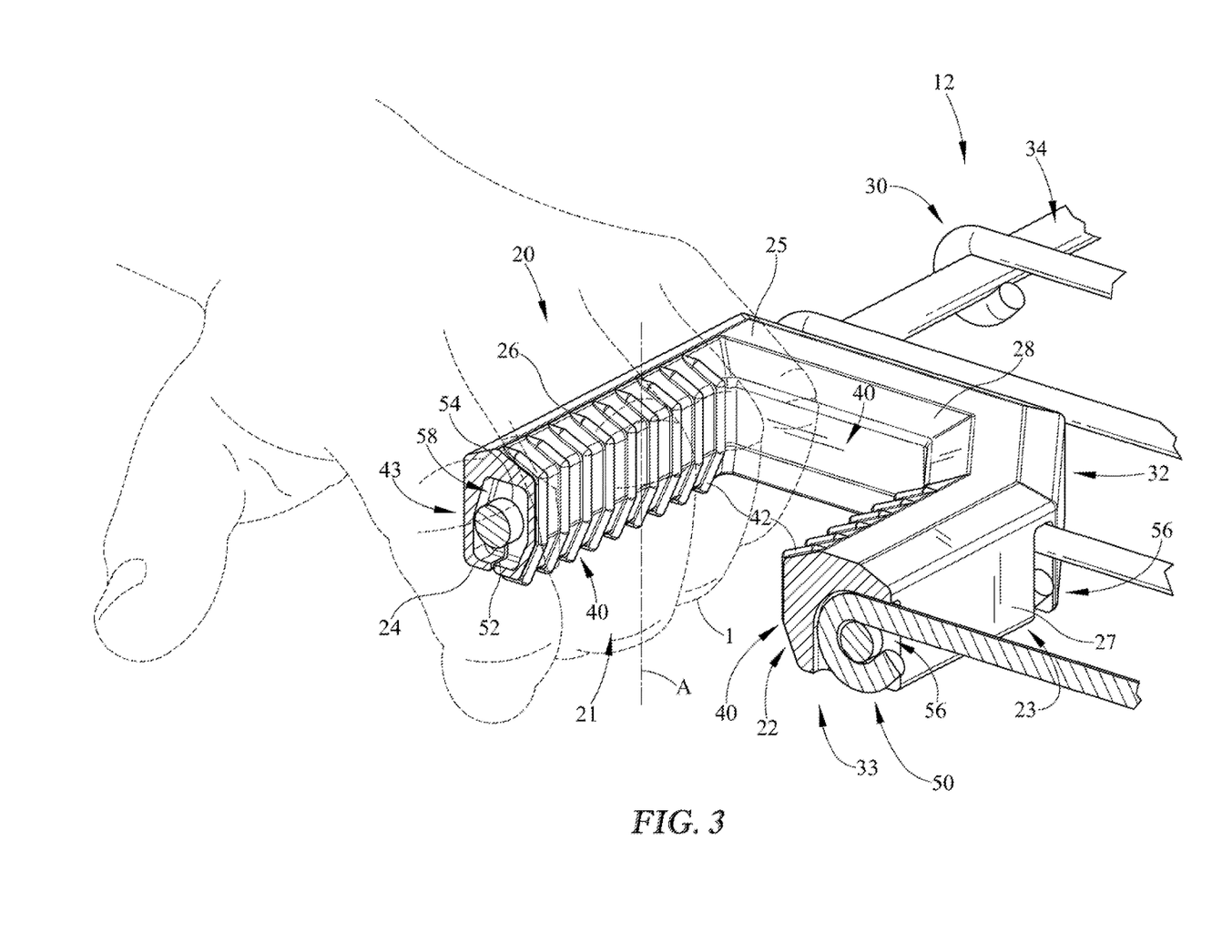
FIG. 3 is a sectional view of the handle of FIG. 1 taken along line 3-3, illustrating the user's hand in broken lines accessing the opening of the handle.

As illustrated in the FIGS. 1-3, the handle 20 may be combined with a support structure or member 30 having a different thermal conductivity. In the embodiment shown, the support structure 30 includes a first thermal conductivity and the handle 20 includes a second thermal conductivity. The second thermal conductivity is less than or lower than the first thermal conductivity. As a result, the user may be capable of contacting the handle 20 as opposed to the support structure 30 when both are heated within the oven cooking compartment 90. It is understood that the handle 20 may be made from a variety of one or more materials such as, but not limited to, silicon. In the embodiment shown, the support structure 30 of the oven rack 12 is made of, but is not limited to, a metallic material. This metallic material may be in the form of a grid and/or wire configuration of the support structure 30 or oven rack 12. The support structure 30 may include one or more handle pockets 32 with defining a through opening 33 adjacent a front end 34 of the support structure 30. The through opening 33 may be defined by a variety of wire configurations of the support structure 30. Although the handle pocket 32 is shown in the drawings in only one embodiment, other wire configurations may be used. In some embodiments as is shown, the through opening 33 of support structure 30 may extend from the front end 34 towards a back end 36 of the support structure 30. It should be understood that the support structure 30 may support, but is not limited to, cooking apparatus or cookware (e.g. pots and pans), and/or baking or cooking foodstuffs, etc. and may be a variety of constructions, quantities, shapes, and sizes and still be used with the handle 20. Although the support structure 30 is for an oven rack 12 as shown, it is understood that the support structure or portions thereof may be a grill rack, broil pan, and/or baking stone. For example, the support structure may be stamped metal, cast, or formed and/or may not be made of wire in some embodiments. Further, in some embodiments, the pan may not be made of wire. In various embodiments, the non-wire or wire support structures may have an enamel coating. Some embodiments may not include an enamel coating. Moreover, in some embodiments, the support structure may include a sliding bearing system. Further, in various embodiments, the support structure may be placed in an oven cavity with formed ribs or a ladder rack rib system.

As shown in FIGS. 1-5, one or more handles 20 may be used with a support structure 30 or portions of the support structure. As shown in the embodiment, the handle 20 may be located adjacent the front end 34 of the support structure 30. The handle 20 may extend from the front end 34 towards the back end 36 of the support structure 30 in substantially the same plane (e.g. horizontal plane) of the support structure. The opening 21 may be transverse or substantially perpendicular to the plane of the support structure 30. In some embodiments, the handle 20 may engage the entire periphery or portions of the handle pocket 32, if used, at the front end 34 of the support structure 30. In some embodiments, the handle 20 may extend along a substantially portion of the entire front periphery or front end 34 of the support structure 30.

As shown in the Figures, the handle 20 may be one or more members to define an inner periphery 22 and an outer periphery 23. The inner periphery 22 of the handle 20 may define one or more depressions or openings 21 in a bottom side 24 and/or a top side 25 of the handle 20. At least a portion of the inner periphery 22 of the opening 21 is at a smaller periphery than the support structure 30 of handle pocket 32 and thereby reduces the contact of the user with the support structure 30. The opening 21 may allow one or more fingers and/or other portions of the hand 1 to be inserted at least partially therein and/or therethrough for the user to engage the handle 20. Although the opening 21 is shown as a through opening extending from the top side 25 to the bottom side 24, it is understood that the opening 21 may be one more depressions, channels, or slots in the top side 25 and/or bottom side 24 that may not extend through the handle 20. The through opening 21 includes a longitudinal axis A transverse to the plane of the support structure 30. More specifically, in the embodiment shown, the through opening 21 is substantially perpendicular to the plane of the support structure 30. Moreover, in the embodiment shown, the through opening 21 extends through support structure 30, from top to bottom, between the front end 34 and back end 36 of the support structure. The handle through opening 21 may extend through or aligned (e.g. axially or coaxially aligned) with the support structure through opening 33 of the handle pocket 32. In various embodiments, the through opening 21 of the inner periphery 22 of the handle 20 may be defined by one or more members of the handle. In the embodiment shown, at least a forward member 26 and a rearward member 27 of the handle 20 may define the inner periphery 22. The forward member 26 may be positioned adjacent the front end 34 of the support structure 30 and the rearward member 27 is spaced away from the forward member 26 towards the back end 36 of the support structure. In some embodiments as is shown, the forward member 26 and the rearward member 27 may be interconnected by two or more lateral members 28 connecting the opposing ends of the members 26, 27, respectively.

Figure 5:
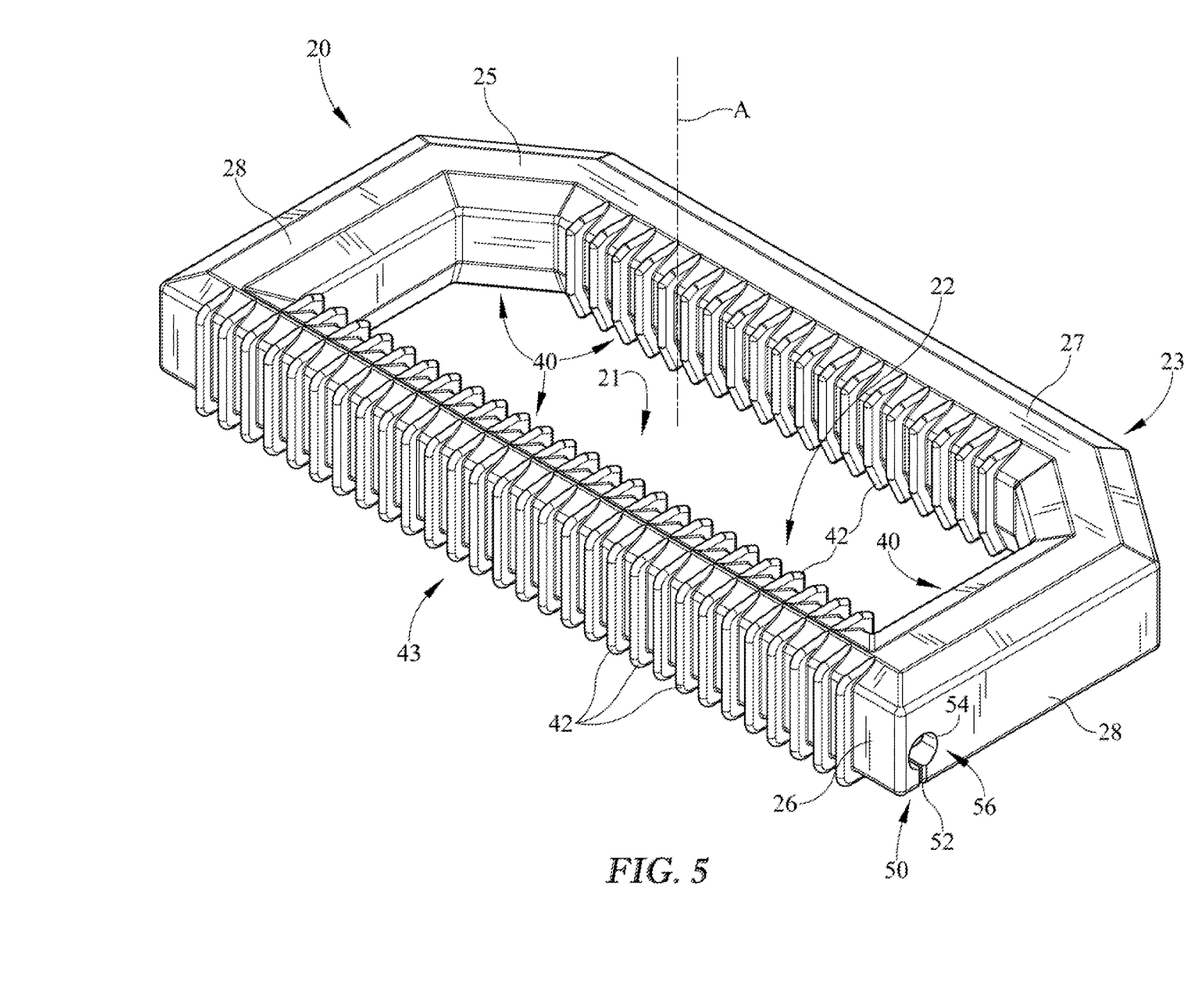
FIG. 5 is a perspective view of the handle of FIG. 1 illustrating another embodiment of contact surfaces for the handle.

As shown in the Figures, the one or more members defining the inner periphery 22 may include a plurality of contact surfaces 40 defining the opening 21. The contact surfaces 40 face inwardly towards the opening 21 defined by the inner periphery 22. The support structure 30 is outside the opening 21 or space between the inwardly facing contact surfaces 40 (e.g. at least two opposing contact surfaces). In some embodiments, one or more of the inwardly facing contact surfaces 40 may include a plurality of protrusions or ribs 42 projecting inwardly into the opening 21. The ribs 42 shown are perpendicular to the plane, or more specifically the horizontal plane, of the support structure 30. However, the ribs 42 may be a variety of orientations, shapes, quantities, or sizes and still minimize the heat transfer between the support structure 30 and the user's hand. It should be understood that the ribs may be a variety of geometries to minimize the contact between the user and the support structure. For example, in some embodiments, the ribs or protrusions may be round or spherical. In some embodiments, the ribs may be horizontal. Although the ribs are shown as continuous, in some embodiments a plurality of ribs may form a discontinuous or broken line/row/column arrangement. Further, the ribs may include thermal breaks or one or more though openings therein. Moreover, in various embodiments, the ribs may be cylindrical projections. In some embodiments, the ribs may be tapered (e.g. tapered inwardly towards opening). The ribs 42 may reduce the contact surface area that may be contacted by the user or may be used to contact the support structure to minimize heat transfer. In some embodiments, one or more surfaces of the handle 20 may include one or more ribs 42 (e.g. outer periphery, inner periphery, one or more inwardly facing contact surfaces, one or more outwardly facing contact surfaces, rearward member, forward member, one or more lateral members, top side, and/or bottom side). In some embodiments, the contacting surfaces 40 of one or more members may not have ribs. If the lateral members 28 are used, the lateral members 28 may not have ribs as shown in the embodiment. However, the lateral members 28 may have ribs in some embodiments. In some embodiments, a pair of the inwardly facing contact surfaces 40 that include the forward member 26 and the rearward member 27 may define the opening 21, or through opening. The inwardly facing contact surfaces 40 may be substantially perpendicular or transverse to the plane of the support structure 30 or front end 34 of the wire configuration to reduce user contact with the support structure. As shown in FIGS. 1 and 5, the forward member 26 may include an outwardly facing contact surface 43. The outwardly facing contact surface 43 may be substantially parallel with the pair of inwardly facing contact surfaces 40 of the forward and/or rearward members 26, 27. In the embodiment shown in FIG. 5, the outwardly facing contact surface 43 may include one or more ribs 42 projecting outwardly. It should be understood, in some embodiments, that the ribs 42 may include a second or insulating material different from the remainder of the handle such as but not limited to a non-conductive material.

In use when reaching in and/or out the opening 21, grasping the forward member 26 and/or repositioning the support structure 30, the user's hand 1 or one or more fingers may be protected from contacting the support structure 30 adjacent the forward member 26 by at least one of the rearward member 27 and one or more lateral members 28. At least the spaced apart rearward member 27 may function as a back stop, forward movement stop, or brush guard relative to the support structure 30. Moreover, in some embodiments, the one or more lateral members 28 may function to reduce or stop the lateral movement of the user's hand 1 when reaching into or out of the opening 21 or when repositioning the support structure 30. The user may engage the opening 21 of the handle 20 from the bottom side 24 and/or top side 25 of the handle 20 and still be protected by the handle configuration. The user may engage the handle 20 and apply a variety of directional forces. The user may be able to utilize the handle configuration (e.g. the opening 21) and may, but is not limited to, pull, push, grasp, lift, and/or pinch the handle to reposition the support structure 30.

The handle 20 may be engaged with the support structure 30 in a variety ways or methods. The handle 20 may be manufactured integrally with the support structure 30 or assembled thereafter. In the embodiment shown, the handle 20 snaps onto or slides into engagement with support structure 30. As such, some embodiments of the handle may not need additional clips or snaps to engage the support structure. The bottom side 24 of the handle 20 includes one or more slots 50 to receive the support structure or wire configuration 30. The handle 20 receives the support structure defining the handle pocket 32 in the embodiment shown. In the embodiment shown, the slot 50 increases in size from the bottom side 24 to the top side 25 of the handle 20. The slot 50 includes a first portion 52 adjacent the bottom side 24 interconnected with a second portion 54 towards the top side 25. The first portion 52 is smaller than the second portion 54, thereby the support structure 30 passes through the narrower first portion 52 and rests in the second portion 54 of the slot 50. Slot 50 may include one or more lateral openings or slots 56 in the one or more handle members to allow the support structure 30 to extend out of the handle 20 in the horizontal plane when assembled. If silicone or another substantially flexible material is used, the handle 20 defining the first portion 52 of the slot 50 flexes apart to allow the wire configuration or support structure 30 to pass through and return/snap together to a rest position to secure the support structure 30 within the second portion 54 of the slot 50 and projecting out through the lateral slots 56. Although the handle 20 may be attachable/removable relative to the support structure 30 as shown, the handle may be nonremovable in some embodiments. Although the handle is shown as being subsequently assembled to the support structure, a variety of engagements may be used to secure the handle 20 to the support structure 30. For example, the handle 20 may be molded directly upon the support structure 30. As a result, the handle may be non-removable. Moreover in some embodiments, the handle may be secured via heat resistant hook and loop type fasteners. Alternatively, one or more metal snaps may be used to secure the handle to the support structure in some embodiments.

Figure 4:
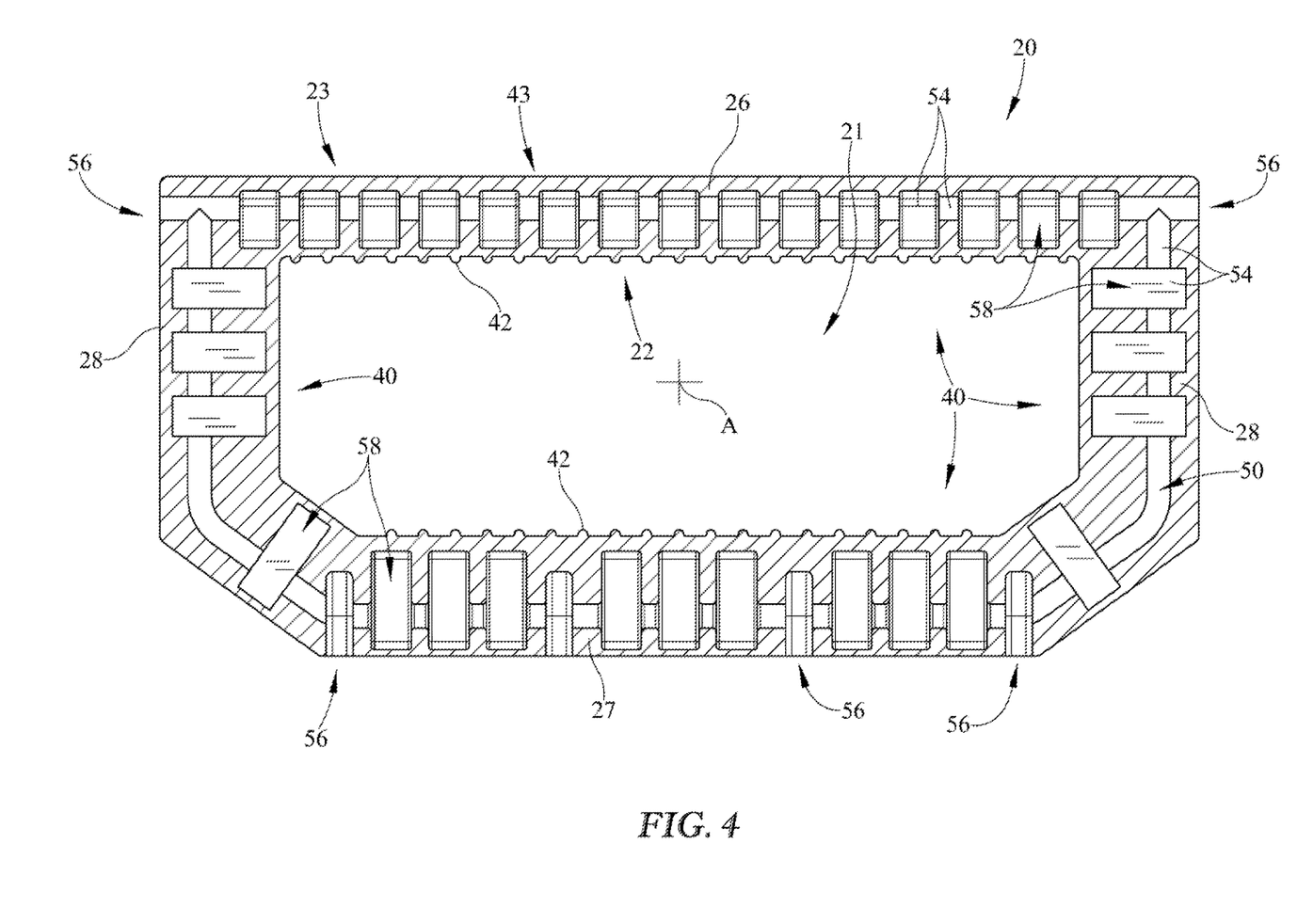
FIG. 4 is a sectional view of handle of FIG. 2 taken along line 4-4 illustrating the receiving slots and voids.

As shown more clearly in FIGS. 3 and 4, the one or more slots 50 may further include a plurality of cavities or voids 58 along the slot 50 to reduce the surface area in contact with the support structure 30 or metal/wire configuration. As a result, the voids 58, if used, the temperature of the handle 20 may be reduced. It should be understood, in some embodiments, that the voids 58 may include a second or insulating material different from the remainder of the handle such as but not limited to a non-conductive material. Moreover, in various embodiments, the handle 20 may include a second or insulating material between the support structure and at least a portion of the handle material. In some embodiments, the handle 20 may include a plurality of ribs extending between the support structure and at least a portion of the handle material to minimize heat transfer.

Embodiments of the one or more handles 20 may have one or more central or through openings 21 therein. The handle 20 may be circular in shape or ring shaped and define a variety of openings 21. The inner periphery 22 of the handle may protect the hand 1 about 360 degrees or portions thereof. The through opening 21 may by a variety of shapes, sizes, constructions, quantities, and orientations relative to the support structure 30 and still be within the scope of the invention. The inner periphery 22 and/or outer periphery 23 of the handle 20 may be continuous or discontinuous about the ring shaped. Although the embodiment shown includes a continuous handle 20 about the through opening 21, it should be understood that the inner periphery 22 may be discontinuous. An embodiment may include a handle with a plurality of disconnected members to create one or more inwardly facing contact surfaces about the longitudinal axis A or inner periphery 22. For example, in some embodiments, the handle may include the forward and rearward members 26, 27 without the lateral members 28 and be discontinuous about the opening 21 while still allowing adequate finger or hand access therebetween to be inserted into the opening 21. Moreover, the handle in some embodiments (e.g. lateral members, rearward member, and/or forward member) may include a plurality of spaced members or include a plurality of slots on the inwardly facing contact surfaces that are of a size and spacing that will not allow the fingers to reach the exposed support structure from the inner periphery.

In some embodiments, the handle 20 may be molded in a variety of methods and materials. One method may include a three piece mold assembly having a lower mold, upper mold, and a core mold. The core mold may define the slot and/or voids for receiving the support structure. In some embodiments, the handle 20 may be molded directly on the support structure 30.

As shown in FIG. 1, the handle 20 may be used in a home oven or cooking appliance 10, such as but not limited to a slide-in or drop-in cooking range, built-in, or free-standing oven, having a housing 13 and the cooking compartment 90, such as a baking oven, convection oven, steam oven, warming drawer and the like. The cooking compartment 90 may be accessible through a front door or drawer 16 in the front of the housing 13. In the embodiment shown, the front door 16 is hingedly connected, by one or more hinges 14, for opening to allow frontal access into the cooking compartment 90 through opening 92. As shown in the embodiment, the opposing side walls 97 may have rack supports 99 for the support structure 20 or shelves. The front door 16 may at least partially define the cooking compartment 90 and be positionable between an opened position (FIG. 1) and a closed position relative to the remainder of the one or more of the walls or sides of the cooking compartment 90. It should be understood that the one or more cooking compartments 90 may be heated by electric, hybrid of gas and electric, or combination of heat sources thereof. One application of an embodiment of the cooking appliance may be for a general purpose kitchen oven. The cooking appliance 10 may include, for example, be a gas range. The cooking appliance 10 may include a cooktop surface 18 on a top of the housing 13. The cooking appliance 10 may further include a control panel 11 having a plurality of control knobs or controls 11a for controlling the gas burners, if a range used, and/or cooking compartment 90.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. An oven rack for supporting a cooking apparatus in an oven, the oven rack comprising:
   a support structure having a front end and a back end defining a wire configuration, wherein the support structure includes a first thermal conductivity and configured to support the cooking apparatus thereon, and wherein the support structure includes a handle pocket defining a through opening, wherein the handle pocket extends from the front end of the support structure towards the back end and the wire configuration surrounds the handle pocket away from the front end;
   a handle engaging the handle pocket and the front end of the support structure and extending from the front end of the support structure towards the back end, wherein the handle defines an inner periphery and an outer periphery, wherein the inner periphery defines a through opening and is continuous about the through opening of the handle, wherein the handle includes a top side and an opposing bottom side, wherein the bottom side includes a slot to receive both the front end and the handle pocket of the support structure, wherein the slot includes a plurality of lateral slots wherein both the front end and the wire configuration of the support structure projects out through the plurality of lateral slots, and the handle has a second thermal conductivity; and
   wherein the second thermal conductivity of the handle is lower than the first thermal conductivity of the support structure.

2. The oven rack of claim 1 wherein the inner periphery of the handle includes a plurality of ribs projecting inwardly.

3. The oven rack of claim 1 wherein the outer periphery of the handle includes a plurality of ribs projecting outwardly.

4. The oven rack of claim 1 wherein the through opening of the handle includes a longitudinal axis extending from the top side of the handle towards the bottom side of the handle, wherein the longitudinal axis is transverse to a plane of the support structure.

5. The oven rack of claim 1 wherein the through opening of the handle extends through the wire configuration of the support structure.

6. An oven rack for supporting a cooking apparatus in an oven, the oven rack comprising:
   a support structure having a first thermal conductivity and configured to support the cooking apparatus thereon, and the support structure includes a handle pocket defining a through opening positioned between a front end and a back end of a planar wire configuration;
   a handle engaging the handle pocket and having a first member spaced away from a second member, wherein the first member covers only a portion of the front end of the planar wire configuration and the second member is spaced into the planar wire configuration towards the back end wherein each of the first member and the second member have an inwardly facing contact surface defining an opening there between, wherein the handle pocket of the support structure is outside the opening between the inwardly facing contact surfaces of the first member and second member;
   wherein the handle includes a top side and an opposing bottom side, wherein the bottom side includes a slot to receive the support structure, wherein the slot includes a plurality of lateral slots allowing both the planar wire configuration and the front end to project through the plurality of lateral slots away from the handle; and
   wherein the handle has a second thermal conductivity, and the second thermal conductivity of the handle is lower than the first thermal conductivity of the support structure.

7. The oven rack of claim 6 wherein the handle includes a top side and an opposing bottom side, wherein the opening extends from the top side to the bottom side.

8. The oven rack of claim 6 wherein the handle includes a pair of lateral members connecting opposing ends of each of the first member and second member, respectively.

9. The oven rack of claim 6 wherein a first portion of the slot adjacent the bottom side is smaller than a second portion of the slot towards the top side.

10. The oven rack of claim 6 wherein the opening includes an axis transverse to a plane of the support structure.

11. An oven rack comprising:
a support structure having a first thermal conductivity and a wire configuration in a first plane, wherein the wire configuration has a front end and a back end defining a handle pocket, wherein the handle pocket extends along and from a portion of the front end of the wire configuration and extends to a distance between the front end and the back end within the wire configuration;
a handle in the first plane having a second thermal conductivity and engages the front end and the back end of the wire configuration defining the handle pocket, wherein the second thermal conductivity of the handle is lower than the first thermal conductivity of the support structure, and wherein the handle is a ring shaped handle having an inner periphery and an outer periphery, wherein the inner periphery defines an opening extending substantially perpendicular to the first plane of the support structure;
wherein the handle includes one or more slots, wherein the support structure extends from the one or more slots away from the handle; and
wherein the inner periphery of the handle includes a pair of opposing inwardly facing contact surfaces substantially perpendicular to the front end of the wire configuration to reduce user contact with the wire configuration.

12. The oven rack of claim 11 in combination with an oven.

13. The oven rack of claim 11 wherein the outer periphery of the handle adjacent the front end of the support structure includes an outwardly facing contact surface, wherein the outwardly facing contact surface is substantially parallel with the pair of opposing inwardly facing contact surfaces.

14. The oven rack of claim 11 wherein the handle includes the one or more slots on a bottom side of the handle to receive the handle pocket and the front end of the support structure therein.

15. The oven rack of claim 14 wherein the one or more slots increase in size from the bottom side towards a top side of the handle.

16. The oven rack of claim 11 wherein the handle includes a top side and an opposing bottom side, wherein the opening defined by the inner periphery is a through opening extending from the top side through the bottom side.

17. The oven rack of claim 11 wherein the one or more slots include one or more lateral openings.

* * * * *